(12) United States Patent
Mishchenko

(10) Patent No.: US 8,335,827 B2
(45) Date of Patent: Dec. 18, 2012

(54) SYSTEMS AND METHODS FOR EXCHANGING INFORMATION IN A LARGE GROUP

(76) Inventor: Yuriy Mishchenko, Ashburn, VA (US)

(*) Notice: Subject to any disclaimer, the term of this patent is extended or adjusted under 35 U.S.C. 154(b) by 691 days.

(21) Appl. No.: 12/480,325

(22) Filed: Jun. 8, 2009

(65) Prior Publication Data

US 2010/0011072 A1 Jan. 14, 2010

Related U.S. Application Data

(60) Provisional application No. 61/080,113, filed on Jul. 11, 2008.

(51) Int. Cl.
*G06F 15/16* (2006.01)

(52) U.S. Cl. .......................... 709/206; 709/203; 709/207

(58) Field of Classification Search ................ 709/206, 709/207, 246

See application file for complete search history.

(56) References Cited

U.S. PATENT DOCUMENTS

| | | | |
|---|---|---|---|
| 6,493,703 B1 * | 12/2002 | Knight et al. ................. | 1/1 |
| 6,816,884 B1 * | 11/2004 | Summers ....................... | 709/206 |
| 6,883,014 B1 * | 4/2005 | McErlean ....................... | 709/202 |
| 6,901,394 B2 * | 5/2005 | Chauhan et al. ............... | 706/60 |
| 7,159,011 B1 * | 1/2007 | Knight et al. .................. | 709/207 |
| 7,188,078 B2 * | 3/2007 | Arnett et al. .................. | 705/7.31 |
| 7,359,936 B2 * | 4/2008 | Gruen et al. ................... | 709/203 |
| 7,454,475 B1 * | 11/2008 | Coleman ........................ | 709/207 |
| 7,577,656 B2 * | 8/2009 | Kawai et al. .................. | 1/1 |
| 7,593,995 B1 * | 9/2009 | He et al. ......................... | 709/206 |
| 7,844,666 B2 * | 11/2010 | Horvitz et al. ................. | 709/206 |
| 8,024,415 B2 * | 9/2011 | Horvitz et al. ................. | 709/207 |
| 8,086,671 B2 * | 12/2011 | Helland et al. ................ | 709/204 |
| 8,122,096 B2 * | 2/2012 | Kussmaul et al. ............. | 709/206 |
| 2003/0028603 A1 * | 2/2003 | Aktas et al. .................... | 709/206 |
| 2008/0222257 A1 * | 9/2008 | Mukherjee et al. ........... | 709/206 |
| 2008/0281927 A1 * | 11/2008 | Vanderwende et al. ...... | 709/206 |
| 2009/0094340 A1 * | 4/2009 | Gillai et al. .................... | 709/206 |
| 2009/0150507 A1 * | 6/2009 | Davis et al. .................... | 709/207 |

* cited by examiner

*Primary Examiner* — Kamal Divecha
(74) *Attorney, Agent, or Firm* — Tran & Associates

(57) ABSTRACT

Systems and methods are disclosed for actively all-to-all exchanging messages in a large group of individuals, comprising accumulating messages from individuals in at least one hub, processing and reorganizing accumulated messages and their groups into short representations of the messages, and selectively actively delivering short representations according to a distribution pattern found as a maximum of a goodness function. Processing and reorganizing accumulated messages into short representations, that is summarization, is performed by constraining the stream of messages to a hierarchical stream format, having a hierarchy of messages linked by a directional parent-child relationship, and iteratively replacing the parent messages in such hierarchy with a representative message chosen among all children of that message. Distribution pattern of the messages containing short representations is found by constrained maximization of a predetermined goodness function depending on the entire distribution pattern jointly for all messages and all users. The process of summarizing messages into short representations, and the process of calculating goodness function for distribution patterns are formulated in terms of statistical model of individuals' expertise and interests, which is learnt from observing past individuals' activity.

16 Claims, 9 Drawing Sheets

FIG. 4a $$R[G] = \operatorname*{mean}_{X} \operatorname*{mean}_{D \in G(X)} (PI_X(D))$$

FIG. 4b $$PI_X^{\{Y\}}(RC) = 1 - \prod_{\{Y\}} \prod_{C} \left(1 - RC(C)VI_X^Y(C)\right)$$

FIG. 4c $$PO_{\{X\}}(RC) = 1 - \prod_{\{X\}} \left[1 - \prod_{C} \left(1 - RC(C)(1 - VO_X(C))\right)\right]$$

FIG. 5a
$$S(x) = \text{mean}(\ln[E \cdot P(x) + (1-E) \cdot (1-P(x))])$$

FIG. 5b
$$\Delta x = \frac{1}{E - (1-P(x))} \frac{\partial_x P(x)}{|\partial_x P(x)|} \cdot a$$

FIG. 5c
$$\partial_{RC(C)} P \propto \sum_{\{Y\}} \frac{VI_X^Y(C)}{1 - RC(C)VI_X^Y(C)}$$

FIG. 5d
$$\partial_{VI_X^Y(C)} P \propto \frac{RC(C)}{1 - RC(C)VI_X^Y(C)}$$

FIG. 5e
$$\partial_{VO_X(C)} P \propto \frac{RC(C)}{1 - RC(C)(1 - VO_X(C))}$$

SYSTEMS AND METHODS FOR EXCHANGING INFORMATION IN A LARGE GROUP

The present application claims priority to U.S. Provisional Application Ser. No. 61/080,113, filed Jul. 11, 2008, entitled "Method for all-to-all active communication channel in large groups of individuals", the content of which is incorporated by reference.

BACKGROUND

The present invention relates generally to methods for electronic communications that allow all-to-all exchange of information in large groups of individuals.

Development of the Internet resulted in dramatic changes in the scope and speed of personal communications. Throughout past two decades these changes have been fueling radical shifts in the ways information is shared and exchanged amongst people. In the realm of personal communications, for example, new technologies emerged that improved upon traditional means for communications by capitalizing on the possibilities offered by the Internet. Thus, e-mail became the Internet extension of common mail, Internet-forums became the Internet extension of billboards, and chat-rooms became the Internet extension of face-to-face conversations. These developments already had tremendous impact on the society and culture. Yet, the Internet possesses even greater potential for overhauling the realm of personal communications. Specifically, rapidity and scope of communications in the Internet allows radically new communication modality such that each person in a large group of individuals is effectively connected to all other persons via an active communication link. Such modality should allow individuals to effectively chat "live" with the entirety of other Internet users, offering radically improved access to the communal knowledge-base and know-how by connecting experts and users via direct link rather than publications in static data repositories, and making rapid sharing and collaborative processing of information in large groups of individuals possible. The impact of such development should be even greater given ongoing fusion between Internet and mobile personal communication devices, such as cell phones, which will allow merging such communication modality with everyday personal life.

SUMMARY

In one aspect, a system and a method are disclosed for electronic communications aimed at connecting members of large groups of individuals via all-to-all active communication channel in the form and promptness close to online "live" conversations.

In another aspect, systems and methods are described for providing all-to-all active electronic communication channel in large groups of individuals by accumulating messages from individuals; organizing messages into plurality of distinct conversations; automatically generating short summaries for above mentioned conversations or their parts; and actively circulating conversation summaries or their parts among individuals in a manner that maximizes a certain overall goodness of the distribution pattern, which depends on which summaries/parts were delivered to each individual jointly over all individuals and all summaries/parts, subject to a constraint, which depends on which summaries/parts were delivered to each individual jointly over all individuals and all summaries/parts. A statistical model of individuals' expertise and interests is used to describe likelihoods of individuals submitting relevant contributions to or getting interested in conversations, and to determine the manner in which conversation summaries should be constructed as well as to which individuals they should be delivered during circulation. Model parameters are inferred from observations of past individuals' activity.

In another aspect, an electronically implemented method for actively exchanging messages in a group of individuals includes accumulating messages from individuals in at least one hub; processing and reorganizing accumulated messages and their groups into short representations of the messages; and selectively distributing messages containing the short representations according to a distribution pattern achieving a constrained maximum of a goodness function depending on the distribution pattern and parameters describing group members and the messages.

In yet another aspect, a method for distributing messages to individuals in a communication system includes accumulating messages from individuals in at least one hub; and distributing messages to individuals according to one or more distribution lists specifying which messages are to be delivered to each individual, wherein the one or more distribution lists are chosen by finding a maximum of a goodness function.

In yet another aspect, a method for summarizing a stream of messages includes constraining the messages to a hierarchical stream format having a hierarchy of messages linked by a directional parent-child relationship, and summarizing the messages by iteratively replacing each parent message with a replacement message by applying contents reduction to all children of the parent message. Implementations of the above aspects may include one or more of the following. Users can send messages to the entirety of all other users in the group; these messages are collected by the system embodying the present invention and then continuously circulated amongst users in a specific way described below, which includes strong filtering of a certain type of the stream of incoming messages in the communication channel in order to match individual user's small information-processing capacity with the large amount of information circulating in the system. The filtering includes, first, organizing messages into distinct conversations and representing conversations in the form of short summaries and, second, selectively distributing summaries or novel parts of the summaries to individual users. Generation of conversation summaries can be based on a special conversation format imposed upon users, where users are asked to submit their messages explicitly in a way that allows the system to group similar messages within conversations. Groups of similar messages can be iteratively replaced with shorter summaries according to a particular reduction model and a model of users' expertise. Selective distribution of summaries, or their parts, is based on assigning messages to end-users in a manner that maximizes a particular function that depends simultaneously and jointly on all assignment lists of messages to users for all users, and is subject to certain constraints describing allowed assignment patterns, which also may be a function simultaneously and jointly or individually of the assignment lists of messages to users. For example, the maximized function may be the sum of certain match-scores between a message and a user over all assigned user-message pairs, and the constraint may be that each individual user receives at most a given number of incoming messages. A model for statistical likelihoods that the conversation will cause interest with a given individual may be used to evaluate such match-scores, using a model of individual's expertise and interests constructed for each user by observing his/her past activity.

BRIEF DESCRIPTION OF THE DRAWINGS

FIGS. 4a-4c show exemplary definitions and formulas used in performing automatic reduction of information and selective distribution of messages to different users according to the statistical model of user interests and expertise.

FIG. 5a-5e show exemplary definitions and formulas used in the process of updating the statistical model of user interests and expertise.

DESCRIPTION

Figure 1:
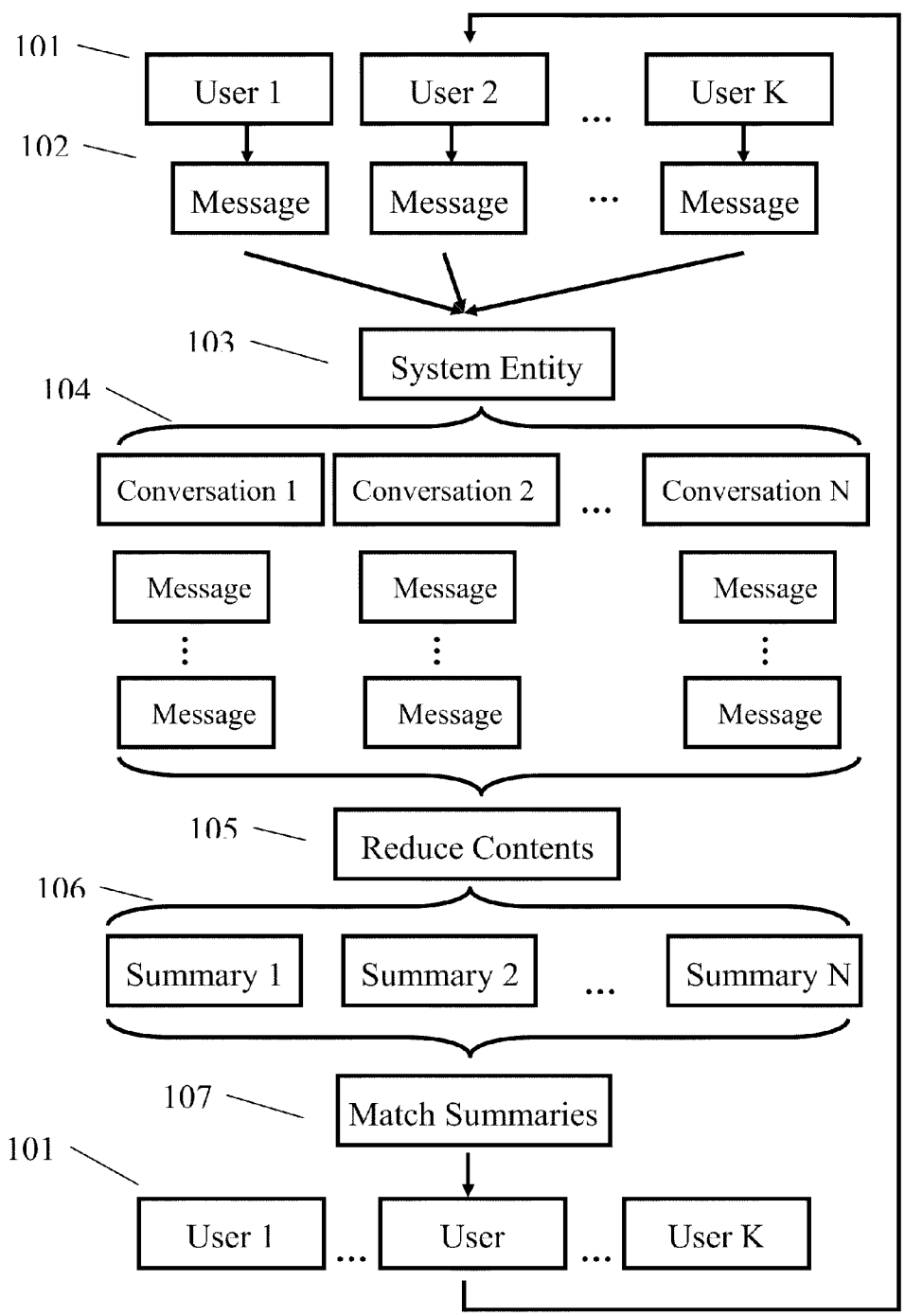
FIG. 1 is an exemplary process illustrating all-to-all active communication channel for a large group of individuals.

FIG. 1 is an exemplary process illustrating all-to-all active communication channel for a large group of individuals. This process is a synthesis of offline Internet mass-communication methods, such as Internet forums and mailing lists, and online Internet point-to-point communication methods, such as Internet chat-rooms and messaging. The system provides all-to-all active communication channel for large groups of individuals, whereas each user in the group is connected via "live" link to the entirety of all other users in the group. This is different from conventional approach for achieving similar ends, where users typically have to submit a message first into a static data repository, from which such message then may be retrieved by other users.

An active communication channel is a communication model where information is delivered directly to a user's desktop, inbox, mailbox, mobile communication device. The information is presented to the user without a prior request for the delivery of a particular article. The active communication model differs from the passive communication model, where information is stored in a repository such as book, newspaper, CD, library, website, files-server, and where information is presented to the user only after the user explicitly requests the presentation of a particular article by some means. Therefore, mail, phone, Short Message Service, Instant Messengers, Internet chatrooms are examples of active communication channels, whereas conventional paper publications, books, newspapers, magazines, and Internet news websites, Internet forums and wikis are the instances of passive communication channels. Conventionally, while passive communication channels have been used to disseminate information and, thus, address large groups of individuals such as entire communities, active communication channels could be only used to connect two individual users or their small groups (as in teleconferences).

An all-to-all active communication channel is a communication system utilizing the active communication model to address entire large groups of individual, as in community, instead of single individuals or their small groups, and where feedback may be fetched to new messages from such large group of individuals as a whole. In a sense, the all-to-all active communication channel is a communication system which is like a newspaper, Internet news or Internet forum website in purpose, but where information is disseminated and feedback is obtained to/from all individuals in a community in an automated manner without user requests. This is in contrast with conventional systems where data is stored in a repository and made available upon requests through searching or browsing efforts of the user.

The active delivery of all messages to all users is not necessarily implied in the above communication system—whereas the feedback from the large group may be estimated by sampling a small sub-group of individuals, it may be sufficient to only deliver the messages to a few of such individuals. For example, people often ignore most new information or articles they receive, while only few get interested—thus it may be sufficient to only deliver new articles to only such interested individuals in order to achieve the same effect of exposing all individuals in the group. In another example, when posing a question to the group, often only a few individuals provide an answer or a representative spectrum of answers—thus it may be sufficient to only deliver that question or article to only such individuals that will give relevant answers in order to achieve the same feedback of exposing all individuals in the group to the question. These examples show that such all-to-all active communication channel has to be "smart"—the system needs to know how to distribute incoming and how to collect returning information in order to achieve the same impact as when delivering information to all users without actually doing so.

Depending on the speed with which information is delivered to individuals, the communication via such channel may be slow-paced or fast-paced. The "all-to-all" active communication channel can circulate information in real-time, reaching target individuals in the time frame of seconds to minutes, thus creating an impression of directly talking to a "person" on the other end of the channel, for example, as if using Instant Messenger or email—what is called as all-to-all active communication channel in the form and promptness close to online "live" conversations. Of course, slower-paced implementations of such all-to-all active communication channel are also possible.

In FIG. 1, users from the group 101 produce and send messages 102 to the system entity 103. All such messages 102 are collected by the system entity 103 in a common pull of messages 104; the messages in such pull 104 would be typically divided into different conversations, although such organization is not obligatory. Because it is naturally expected that the amount of information in 104 will be much greater than the amount of information that each one individual user may process, users may not interact directly with the stream of messages 104, but only with a highly refined view of the activity. In order to match the amount of information circulating in the group to the amount of information that may be processed by one individual, the stream of messages is filtered before reaching different individuals in steps 105 and 107.

First, in block 105 the contents of the messages 104 are reduced without or with acceptable loss of information using certain summarization procedure. Often, streams of messages in conversations may be replaced with substantially shorter, while equivalent or sufficiently close, summaries. Such equivalent summaries are known as short representations of streams of messages. Short representations generally would comprise a text, sound or a video document describing a group of messages within the conversation in some equivalent terms in such a way that can be surveyed by an individual in substantially smaller amount of time that would be otherwise required to look through all the messages in thus summarized, or represented, group. Such short representations may be produced in a number of different ways, as described below.

After operation 105, the large common pull of all messages 104 is reduced to a smaller collection of summaries 106. The number of such summaries still may be too great to allow them all reaching the end-user. Thus, in the process 107 the stream of all summaries is further filtered by means of matching summaries to individual users in a way that maximizes a certain function of the overall assignment pattern subject to a certain constraint, so that only a small number of summaries is delivered to each individual. This operation is represented in FIG. 1 with block 107. In this process, a function is defined that assigns certain "goodness" value to each distribution pattern of messages to users, as defined by distribution lists comprising specifically the lists of messages to be delivered to each user. Such goodness value may also obviously depend on any parameters describing the messages and the users, comprising any sets of numbers or symbols assigned to messages or users either automatically or manually in order to reflect differences and similarities among the messages or the users. Examples of such parameters are the categories to which the message may belong, counts of different keywords in the message, categories of topics that are interesting to the user, accuracy of responses of the user, frequency of responses of the user, the user's age, education, social status, etc., in short, all and any features and characteristics that may be assigned to the messages and the users for the purpose of describing them, or their derivatives. Such parameters are known as features of the messages or the users.

Such goodness value may depend either on the distribution lists individually for each user and the features describing the messages and that individual user, either explicitly or in an aggregate form as in a match-score to be introduced further in this description, or on the distribution lists jointly for all users and the features describing all messages and all users jointly. By matching summaries to users in a way that maximizes a certain goodness function, the system selects such distribution pattern that produces the largest value of the goodness function among all possible distribution patterns, or selects such distribution pattern via a mathematically equivalent procedure. If, instead of all possible distribution patterns, the distribution pattern is selected such that it produces the largest value of the goodness function only among distribution patterns from a certain set, such maximization is called constrained maximization, and the distribution pattern is then a constrained maximum of the goodness function. Constraints may be imposed on the selection in order to produce a distribution pattern that is acceptable in some sense. For example, straightforward maximization of a goodness function may require sending all messages to the same user, which would not be acceptable. By constraining maximum search to only patterns that satisfy some feasibility criteria, best acceptable distribution pattern is obtained. One example of such feasibility criteria is the condition that each user receives at most a specified number of messages.

After each individual in the group 101 receives a small number of messages, the individuals may respond with new messages, thus, closing the information flow cycle.

In the first filtering operation 105, the messages in the common pull are grouped by similarity of their contents, and such groups of similar messages are iteratively replaced with shorter summaries. For example, the contents of messages in the common pull 104 may be scanned and messages may be grouped according to contents similarity, after which each such group may be replaced with a shorter summary. This process may be repeated iteratively to hierarchically reduce messages in 104 to increasingly compact form, as illustrated in more details in FIG. 2.

Figure 2:
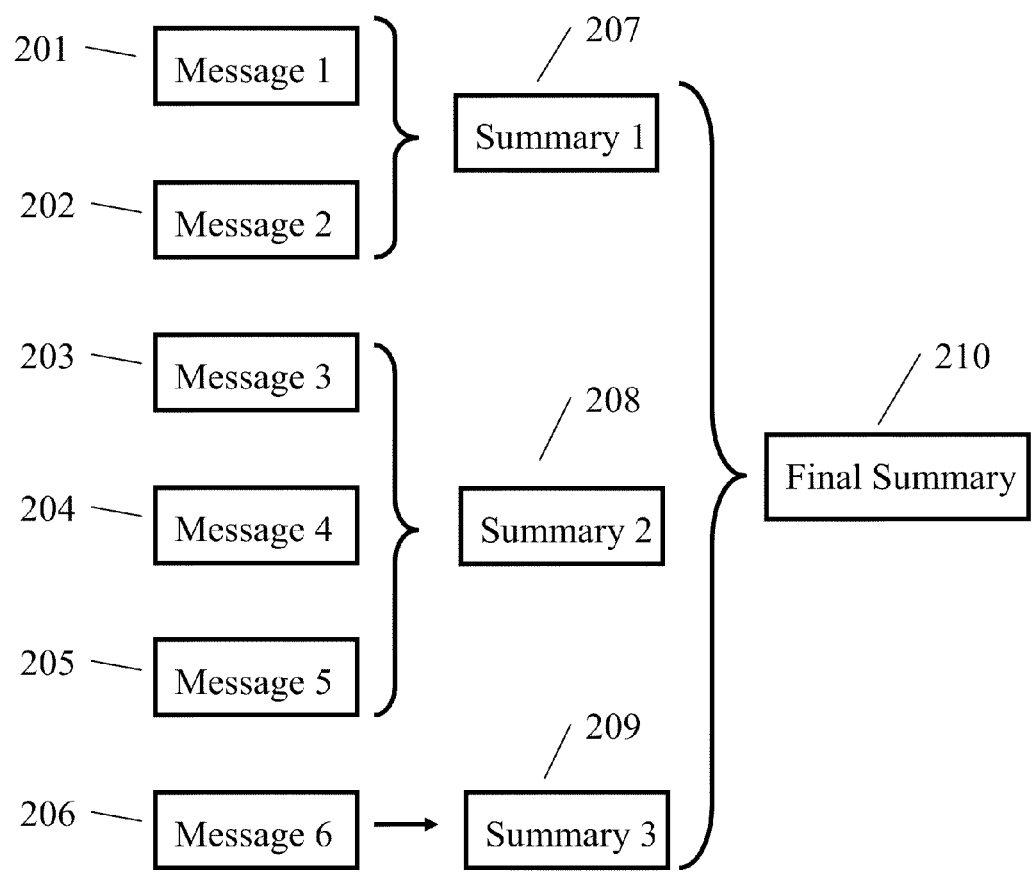
FIG. 2 is an example illustrating the process of reducing large amounts of information by grouping and replacing of similar contents.

In FIG. 2, the common pull of messages contains six messages 201 through 206. Messages 201 and 202, and messages 203 through 205 are similar in the contents and are replaced with summaries 207 and 208. Message 206 is not similar to any other message at this level, and for the purpose of this illustration is replaced with a dummy summary 209 that equals exactly the message 206. Then, produced summaries 207 through 209 may be considered again while the similarity criteria weakened. Thus, the summaries 207 through 209 may be replaced with the final document 210 concisely summarizing the contents of all original messages 201-206.

This process may require level of comprehensive understanding of natural languages—that is scanning text documents, identifying similar meanings and producing natural language summaries for them. Alternatively, the task of summarizing conversations may be assigned to humans. However, this option has following pitfalls: people do not possess required information processing capacity for the scope of a large such envisioned system, it is difficult to find large groups of reviewers and ensure prompt update of summaries, and people may have substantial personal bias which is hard to keep under control.

In one implementation of block 105 (FIG. 1), the system places communication in the system into a predetermined hierarchical format of FIG. 2. In this implementation individuals are asked from the very beginning to view their messages as the editions for the final conversation summary document. All messages, meant to contribute to the same part of the conversation summary are considered similar for the purpose of the reduction such as in FIG. 2, that is they compose similarity groups similar to {201,202} or {203,204,205}. By this, the stream of the messages corresponding to a particular conversation is organized into a hierarchy with directional parent-child relationship, what is called a hierarchical stream format. The parent-child relationship in this case is the relationship defined above between the paragraphs inside old messages and the new messages. The parent in such relationship is the paragraph inside an older message, and the child in such relationship is the new message intended as the edition of that paragraph. All messages intended as edition of the same paragraph, thus, constitute a group of same parent children. Hierarchy refers to an arrangement of items in which the items are represented as being "above", "below" or "at the same level as" one another. "Above", "below" and "at the same level as" in this case is understood in the sense of the above parent-child relationship, where all parent paragraphs/messages are considered "above" all their children, while all same-parent children are "at the same level". Hierarchies may be visualized, as is common, via directional tree-graphs, where the directional edges point from the parent paragraphs to children messages or vice-versa.

The groups of similar messages may be then iteratively processed and replaced with summary messages, such as 207-209 in FIG. 2, generated by some means from the messages in the group. The process, by which such short representation of the group is generated is called a reduction model, and the resulting short representation of all messages in the group is called a replacement message, as it is intended to replace the entire group of similar messages for all subsequent ends and means, including information querying, presentation or circulation. The reduction model may encompass a variety of solutions of varying degree of complexity, from manual writing of the replacement messages to complex natural language understanding computer algorithms. A specific implementation for such reduction model is described below.

In order to reduce a similarity group to a summary, the system conducts all-or-nothing competition between all messages within such group, so that a single message from the group is selected to replace the entire group for the conversation summary document. That is, in the example in FIG. 2, summary 207 would be one of the messages from the group {201,202}. To decide which message should be selected the system assigns a rating PO(M) to each message M in the group, that may be viewed as the likelihood that the message M is "correct", that is should be selected from its similarity group. The message with the highest PO(M) is thus selected for the summary. Value of PO(M) may be obtained from a certain model taking into account message contents, some features of the message (such as the categories to which it belongs), authors of the message, etc., or all of the above for all messages in the group, or all of the above for all messages in the group and the other messages in the conversation. The model parameters, in turn, may be estimated for example by observing users' activity and their success in creating messages that get selected for the conversation summaries. This process and the method for computation of the ratings PO(M) for same-parent messages are referred to as a reduction model, whereas such process is applied to reduce the group of similar messages to a short representation, in this case comprising single representative message from the group.

Figure 3:
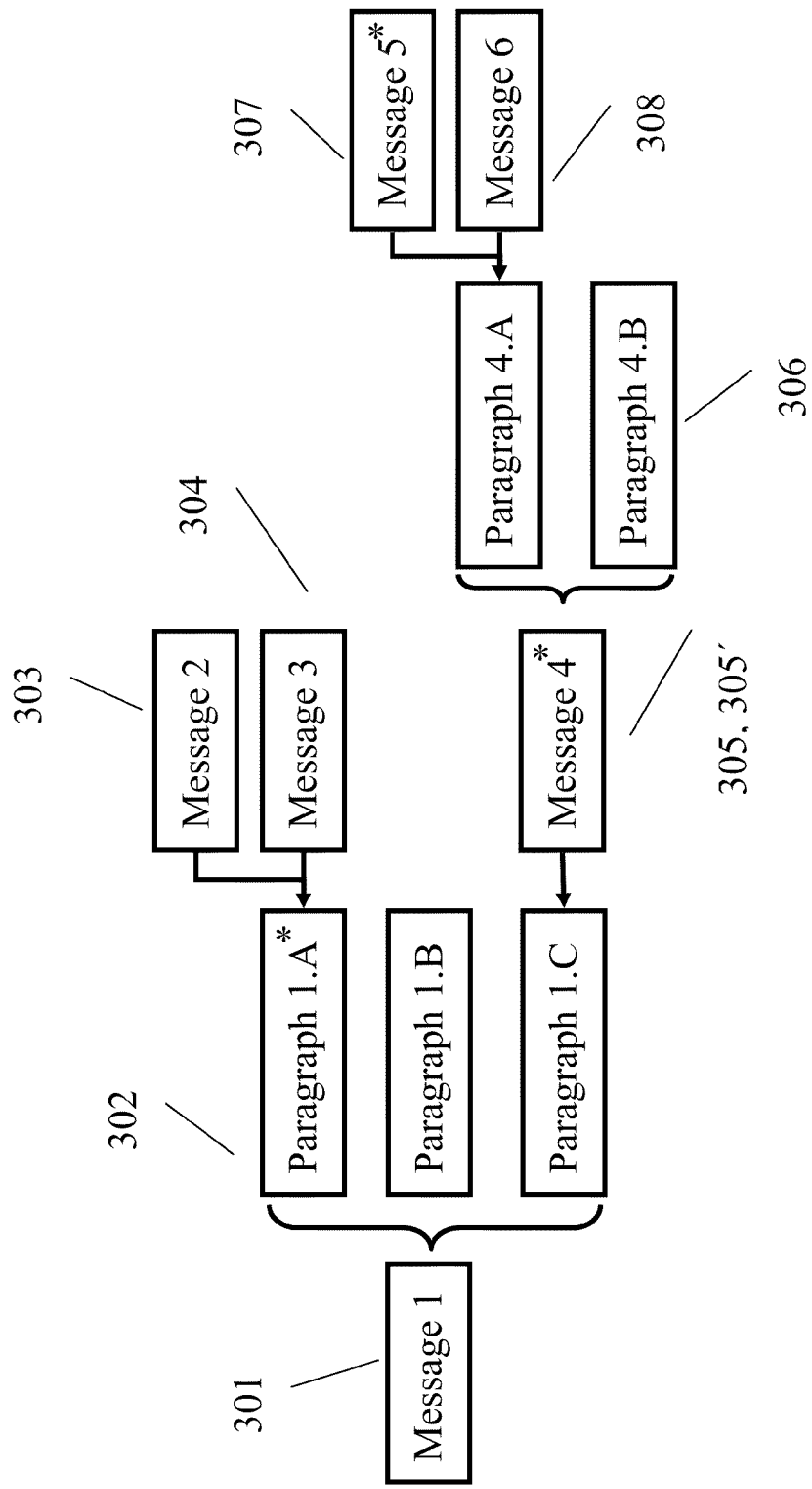
FIG. 3 shows an example illustrating the hierarchical conversation format for automatic reduction of information.

An example of such implementation of the filtering operation 105 is given in FIG. 3, which shows an example illustrating the hierarchical conversation format for automatic reduction of information without natural language analysis of the contents of the messages. In this example, the conversation was started by new message 301 originally defined with three paragraphs 302. During the lifetime of conversation, other users submitted messages 303, 304 and 305 as alternative opinions for the contents of the paragraphs in 302. Arrows indicate for which paragraph each message was intended to be an alternative, with which it thus formed the similarity group. In order to generate the summary for this conversation, groups of messages pointing to the same paragraph comprise a similarity group, and are replaced iteratively with one message from the group according to a certain criterion, indicated here for illustration purposes with symbol "*". In this example, selected messages are paragraph 1.A, paragraph 1.B, message 5 and paragraph 4.B.

In more detail, assume that certain user John had an opinion about a recent musical event, and John submitted a message 301 to the system, embodying the present invention, where he described his opinion in three paragraphs 302, "Paragraph 1.A", "Paragraph 1.B" and "Paragraph 1.C". Assume now that another user, Tracy, had received and reviewed the message 301, and disagreed with the opinion expressed in paragraph 1.A. Tracy then created a new reply message 303. At the time of submission, Tracy was asked to indicate position of her message within the conversation summary, which at that point was purely the original message 301. Let's assume Tracy specified paragraph 1.A as a reference point for her message within the conversation summary such that message 303 was intended to replace paragraph 1.A in 302. This message 303 became an "alternative" for the opinion about the said musical event expressed in the original paragraph 1.A, and together with the original paragraph 1.A formed a similarity group. In the course of further circulation of the message 301, new messages were submitted from other users, adding alternatives for the paragraphs 1.A (message 304) and 1.C (message 305). Message 305, itself, contained two paragraphs 306, thus, aiming to replace paragraph 1.C with a subdivision into two new paragraphs 4.A and 4.B. Consequently, circulation of the message 306 caused two other users to submit messages 307 and 308 as alternatives for paragraph 4.A. All in all, in this example the conversation about a recent musical event, started by John and message 301, there are in five subsequent messages 302-308. These messages are organized into a hierarchical structure as in FIG. 3.

In order to produce a shorter summarized version of this conversation, the groups of messages pointing to the same paragraphs in FIG. 3 are replaced with one message from each group, based on certain criteria. Specifically, from the rightmost level in FIG. 3, first, the group of similar messages for the paragraph 4.A (part A of message 305 and the messages 307 and 308) is replaced with the contents of the message 307, as indicated with "*". Thus, a first summary is formed by replacing part A of the message 305 with the contents of the message 307, and retaining part B of the original message 305. Let us denote this composite summary for the message 305 as 305-prime. Then, second, the similarity group including the paragraph 1.A and the messages 303 and 304 is replaced with the contents of the original paragraph 1.A, as indicated with "*". Third, the group containing the summary 305-prime and the original paragraph 1.C is replaced with the summary 305-prime, as indicated. At this point, the final summary for this example conversation is formed as a document made from the following paragraphs: part A of the message 301, part B of the message 301, message 307 and part B of the message 305, in the listed order.

To recap the foregoing, the system, embodying the current invention, can accumulate many messages and circulate them, all-to-all, within a large group of individual users. These messages are grouped and summarized by means of a certain summarization process, so that groups of messages with similar contents are removed from the circulation and replaced with single equivalent (or sufficiently close) summaries. While summarization process may be implemented in a number of different ways, the summarization process does not necessarily need machine understanding of natural languages. One solution is based on placing users' messaging from the beginning in a special format facilitating summarization procedure. Specifically, users are asked to view exchange of messages in the context of a summary document for conversation, and to supply the position of their messages within that summary document explicitly when they send messages. The summary, then, is formed by replacing iteratively groups of the same-position messages with a single message, according to certain selection criterion.

In the second filtering operation 107, a small number of summaries from 106, or their parts, need to be delivered to different users for review/response. This task is a classic matching problem where the summary documents need to be matched to individual users in some meaningful way. This problem had been most fully experienced by the industry of Internet search engines, decision support systems, as well as certain solutions are known in the prior art for filtering of incoming messages in messaging systems such as newsgroups, mailing lists and RSS-feeds. In order to assign documents to end-users in such systems, typically, a match-score between a document D and the user X, $PI(D)_X$, is calculated in some way. The match-score may be calculated based on the number of user-defined keywords found in the text of the document, weighted sum of such keywords, the degree of overlap between the set of user-defined "interesting" categories and the categories to which the document belongs to, user-defined set of "interesting" authors, etc. It is common to threshold such match-scores to determine which documents should be shown to each given user. For example, the user may be only receiving messages from a given set of categories, or that contain a particular keyword, or from particular author, etc. However, as the number of users in a communication system growth, it is obvious that the number of messages surpassing any preset threshold will eventually be too great for any person to read.

To solve this eventual overload problem, one implementation of block 107 is based on the notion that it is not always necessary to send every information article in the system to "all" respondents. Instead, if the system can find a good respondent for each article, it often will suffice to send each article to only a few best-matching individuals, while also making sure that each of them will receive at most a given amount of communications. A simple example illustrating this point is the following. Consider a social network with 100 members where each member generated one message, so that 100 messages total was created. In the prior systems, each new message would be delivered to each other member's inbox, thus, resulting in 100 messages in each member's inbox. However, this may be entirely unnecessary. If the system can a-priory identify a good respondent for each message, it only needs to distribute one message to one relevant user, while making sure to send every message to at least one user. Thus, the system can assign each of 100 messages to one of 100 users, receiving relevant reply to each of 100 questions and only making each user read 1 message.

More specifically, in this implementation of block 107, let $PI(D)_X$ be match-scores such as described above for all documents to be distributed D and all system users X. In order to decide on how documents should be distributed among users X, the system finds the assignment of messages to end-users (a distribution pattern G) that maximizes a certain "goodness" function of the entire distribution pattern, R[G], while also satisfying a set of constraints specifying which distribution patterns are "acceptable".

The goodness function, as is clear from its name, is meant to be a mathematical construct specifying certain "goodness" value of the distribution pattern, that is to model and describe the "value" of sending specified list of messages to specified users. The choice of the "value" per se is often subjective—one may see such value being the total number of messages reviewed or answered by users in the group (information turnover), the total quality of replies obtained to the messages from users in the group (response quality), etc., and the ways to furthermore model such choice of the "value" are also many. Important notion, however, is that by circulating the messages in a way that has the larger "goodness value" the communication system would perform better in certain sense. Some particular choices exemplifying the notion and the significance of the goodness function are given below.

As such, the goodness function necessarily depends on the lists of messages assigned to end-users in given distribution pattern G, but also it may depend on various parameters and features describing assigned messages and end-users, either directly or in aggregate form such as the match-score above. Also, the choice of the distribution pattern may be unconstrained, meaning that one is searching for the best distribution pattern out of all and any possible distribution patterns, but such solution may not be very meaningful. For example, if one deals with the system primarily focused on circulating and answering questions, the goodness function may be chosen to model the quality of answers obtained per given assignment of questions to respondents. Via unconstrained maximization, it may so happen that all messages on a given topic would need to go to the same user with the most knowledge on the subject. This obviously would be a bad idea. Thus, it is often more meaningful to find the distribution pattern that maximizes the goodness function and also satisfies particular feasibility condition, or, equivalently, belongs to a set of admissible patterns. For example, one may require in the above case that the distribution pattern honors the condition such that each respondent obtains at most 3 questions. Such cases are known as a constrained maximization, and the selected pattern is a constrained maximum.

Obviously, such constraining conditions often may be incorporated directly into the goodness function either in "hard" or "soft" form. For example, one may subtract from the goodness function additional term that is very large whenever the admissibility conditions are not satisfied, thus, making the goodness function very small outside of the allowed domain ("hard" constraint). Or one may subtract from the goodness function additional term which smoothly becomes large when admissibility conditions are not satisfied, thus, allowing for small violations of the constraint but still making the goodness function very small outside of the allowed domain ("soft" constraint). Likewise, one may multiply the goodness function by a term becoming very small outside of the allowed domain and unity inside the allowed domain, or introduce additional "efficiency" component describing how "efficient" the user would be answering the questions if he was sent a given number of them. Such modifications of the goodness function, aiming to restrict the set of distribution patterns that should be considered in the maximization, are equivalent to the above idea of the constrained maximization of a goodness function in order to select the optimal admissible distribution patterns.

For the simple illustration above, the "goodness" function may be the sum of match-scores for all chosen message-user assignments (such as in FIG. 4a), and the constraint may be that only one message may be assigned to each user and only one user may be assigned to each message. The optimal distribution pattern for conversation summaries in this case, in fact, is so called bipartite-matching problem—the distribution pattern that assigns messages to users in one-to-one manner while maximizing the sum of match-score in the distribution pattern. This assignment problem may be solved using known mathematical algorithms. For example, one simple algorithm is to greedily assign each time a document D to user X, corresponding to a yet unassigned pair (D,X), that has the largest match-score $PI(D)_X$, as long as user X does not yet have the maximum allowed number of assigned documents. Such assignments then may be repeated until the distribution lists in G for all users are full.

For example, consider a group of users 101 containing three individuals John, Tracy and Stacy, and the pull of messages 106 containing three conversations "Recent musical event", "New developments in galactic black holes", and "Recent political turmoil in Zimbabwe". Let us assume that match-scores, calculated with certain method, were as follows.

| | "Recent musical..." | "New developments..." | "Recent political..." |
|---|---|---|---|
| John | 0.55 | 0.75 | 0.45 |
| Tracy | 0.85 | 0.5 | 0.2 |
| Stacy | 0.65 | 0.3 | 0.3 |

Assuming that threshold for delivering a message to an individual is 0.5, in a prior system John will receive two out of three messages, "Recent musical event" and "New developments in galactic black holes", Tracy will receive the same two out of three messages, and Stacy will receive only one message "Recent musical event", while one message "Recent political turmoil in Zimbabve" will not be sent to anyone. With the circulation model employed in the present invention, above, John would only receive one message "New developments in galactic black holes", Tracy would receive one message "Recent musical events", and the message "Recent political turmoil in Zimbabve" will be delivered to user Stacy. This achieves obtaining best responses to all messages, while performing the least circulation.

The above distribution method may be employed with match-scores calculated with any method. One process for calculating such match-scores is to use a model of the interaction between users and the documents and the history of user's responses to different documents. This process is based on the following notion that, as success of Google Internet search engine seems to have demonstrated, amid variety of possible strategies for calculating match-scores, the contents-independent matching based on a model of user interactions with WWW, position of a document in WWW, and the relevant statistics had proven to be the most successful for ranking Internet search results. In this sense, the match-score $PI(D)_X$ is viewed as a likelihood that user X will find document D interesting, and the process estimates a match-score from a model of user interactions with the document, and from the observations of the "position" of each given document in relation to other users who had a chance to review it before. More specifically, assuming that the document D had been presented to a sequence of users {Y} with the results {E(Y)}, where E(Y)=1 means that the user Y was interested in the document, and E(Y)=0 means that the user Y was not interested in the document (for example, ignored it), the process uses this information about past-circulation of the document along with a certain prior-model for the interests of user X and users {Y} to make better guesses as to the likelihood $PI(D)_X$ for new user X For example, consider a group of users 101 containing three individuals John, Tracy and Stacy, and the pull of summaries 106 containing two conversations "Recent musical event" and "New developments in galactic black holes". Assuming that Stacy often is interested in the same discussions with Tracy, but not John, when the system circulated "Recent musical event", John ignored a message regarding this conversation, while Tracy indicated interest in this conversation, for example sent a reply. When the system circulated "New developments in galactic black holes", the system found that John indicated interest in this conversation, while Tracy ignored it. Then, based on these observations and the prior model that Stacy's interests are similar with Tracy's and opposite to John's, the system may find that PI("Recent musical event")$_{STACY}$ should be high, for example PI("Recent musical event")$_{STACY}$=0.65, while PI("New developments in galactic black holes")$_{STACY}$ is low, for example PI("New developments in galactic black holes")$_{STACY}$=0.3. When deciding on the optimal distribution pattern G, the system then will assign to Stacy the more interesting "Recent musical event".

One implementation of such prior-model for user interests can be defined via a set of quantities such as $VI(D)_X$, $VI(D)_X^Y$, $VI(D)_X^{-Y}$, etc., among others. The first quantity, naturally, represents the prior belief/likelihood that user X would be interested in the document D given some document's descriptors, the second quantity represents the prior belief/likelihood that the user X would be interested in the document D given user Y was also interested in it before, the third quantity represents such prior belief/likelihood given user Y was not interested in the document D before, and so on. The match-score $PI(D)_X$, then, may be constructed as a function in terms of such VI prior-belief parameters, and the history of presentation of the document D to set of other users {Y}, {E(Y)}. Such match-scores, in turn, may be used to calculate the optimal assignment pattern G, while the prior-belief parameters may be updated statistically from the observations of users' interaction with the documents in the system.

To summarize the foregoing, the conversation summaries formed in the process described in the first part of this patent are delivered selectively and directly to the users. For allocating documents to end-users, one embodiment uses user-document match-scores calculated with certain method, and then thresholded in order to determine which documents should be forwarded to each end-user. In the preferred embodiment assignments are chosen in a way that maximizes a certain global "goodness" function of the entire assignment pattern (that is of the list of all assignments for each message and each user as a whole, jointly), while striving to satisfy certain acceptability constraints for the assignment pattern, such as the maximal number of communications accepted by different users. That is, the system picks allocations of the messages in a large all-to-all messaging systems in a globally optimal sense. Use of such distribution model within large messaging systems is the key to allowing all-to-all circulation of information, capable of obtaining adequate responses to all (or most) submitted messages while not overloading end-users with the stream of incoming information. In order to calculate the "goodness" function, the process computes match-scores for each individual document and each individual user. In the preferred embodiment, the match-scores are viewed as likelihoods of users getting interested in documents, and are derived directly from the observation of users reaction to the documents, and a given model for the expected user-document interaction. That is, the match-scores are calculated using a statistical model of user-conversation interactions, which accounts for statistical dependencies among the interests of different users (that is, common interests, opposite interests, etc.), and the history of different user responses to the circulation of a given conversation summary. The parameters of the model are estimated from the observations of actual user responses upon the presentation of different conversation summaries. Thus, the calculation of the match-scores in the preferred embodiment does not rely on any static arbitrarily defined features of the documents or the users, but instead on the observed relationships between circulating documents and the community of the users.

The preferred embodiment is a communication messaging system that implements the above general principles and propositions in the form of a system accessed via an Internet website, HTML email messages, plain text email messages, messages from Instant Messaging systems, special kinds of messages carrying video or sound media, short text messages (SMS) from mobile communication devices, or messages from Internet-enabled mobile communication devices such as cell phones, and other. Such system should accept incoming messages, organize them according to corresponding conversations, generate summary documents to be delivered to different users, calculate match-scores, decide on the optimal distribution pattern for the generated documents, and then perform distribution of generated documents actively via Internet website, HTML email messages, plain text email messages, messages in Instant Messaging system, SMS messages or an interface of Internet-enabled mobile device, and collect replies, thus, closing information flow cycle FIG. 1.

In the preferred embodiment, messages may be characterized by a list of categories to which the message may belong, and the list of co-authors: the system allows each message to be co-authored by more than single user in order to avoid accumulation of duplicate contents. For example, if a user wishes to contribute a message similar to already existing one, he/she is simply asked to become a co-author of that existing message rather than make a new nearly identical submission. To describe the list of categories for a message, a vector characteristics RC(C) is applied such that RC(C)=1 if the message belongs to category C, and RC(C)=0 otherwise. Characteristics RC need not be binary (that is consisting of 0 and 1), but generally may contain any numbers, thus, describing the "likelihood" or "log-likelihood" that given message would belong to category C.

FIGS. 4a-4c show exemplary definitions and formulas used in such statistical model of user-document interaction. FIG. 4a shows a formula illustrating a possible definition for the overall goodness function R[G] for a distribution pattern G. The distribution pattern is the collection of lists G(X) describing the list of messages to be delivered to user X, each. R[G] is a function of the match-scores $PI(D)_X$ viewed as the likelihoods that the user X will be interested in document D, and the entire distribution pattern G. Means are calculated over all users X and all documents D in the distribution lists G(X). If there is a constant number of users in the system, and the distribution lists G(X) all contain the same number of messages, the means in this formula are equivalent to simple sums. FIG. 4b is an exemplary formula illustrating a possible model for the likelihood $PI(D)_X$ for user X to get interested in document D. Document D here is described by characteristics RC(C), to be introduced below, and the list of co-authors {Y}, so that $PI(D)_X = f(RC;\{Y\})$. FIG. 4c is an exemplary formula illustrating a possible model for the likelihood PO(M), introduced above in the description of the summarization process 105, that the message M should be chosen from its similarity group. Message M here is described by characteristics RC(C) and its co-authors {X}, so that $PO(M)=f(RC;\{X\})$. Features-vector $RC(C)_D$, assigned to each document D, is used to differentiate between different and similar documents, and may be naturally thought of as characteristic of the document belonging to different categories, with which different users identify, such as "music", "sports", "science", etc., although such interpretation is not necessary and vector RC(C) may be also treated fully abstractly.

To implement selection of a single "representative" message from a group of similar messages 105, in the preferred embodiment parameters $VO_X$ are defined that describe the likelihood that message authored by user X should be selected from its similarity group. $VO_X$ may depend on the category C to which the message may belong—user that is good in one category (such as "music") may not be good in another (such as "science"). $VO(C)_X$ may be estimated automatically by observing outcomes of user posting messages within different conversations, as described below. The score PO(M), that models the probability that the message M should be selected from its similarity group, is defined in the preferred embodiment via a formula described in FIG. 4c, given message characteristics RC(C), list of its co-authors {X} and the parameters $VO(C)_X$ for these users. This formula represents an OR-AND logical relationship involving the individual likelihoods $VO(C)_X$ and the message characteristics RC(C). More specifically, this formula implements the logical predicate "The message should be picked from its similarity group as long as the above is true with respect to AT LEAST ONE of its co-authors, while for each of its co-authors the above shall be true as long as it is true with respect to ALL categories of the message". Formula in FIG. 4c depends on weights RC of the message M and the list of its co-authors {X}. This parameterization is described here as an example and other forms of parameterization for PO(M) are obviously also possible.

To implement selection of conversations documents to be diverted to each user for review 107, in the preferred embodiment, ratings $VI_X^Y$ are defined that represent the likelihood that user X will find the conversation interesting if user Y co-authored it. As with $VO_X$, $VI_X^Y$ may also depend on the category C to which the conversation belongs—users that have common interests in one category (such as "music") may not have common interests in another (such as "science"). Ratings $VI(C)_X^Y$ can be estimated by observing results of presenting user X with the messages co-authored by user Y, as described below. The score $PI(D)_X$, that models the probability that user X will find conversation D interesting, in the preferred embodiment may be defined via a formula described in FIG. 4b, given conversation characterization RC(C), list of conversation co-authors {Y} and ratings $VI_X^Y$ for these users. This formula represents an OR-OR logical relationship involving the likelihoods $VI(C)_X^Y$ and characteristics RC(C). More specifically, this formula implements the logical predicate such as "user X will be interested in conversation D as long as the above is true for AT LEAST ONE of its co-authors {Y}, while for each of its co-authors {Y} the above shall be true as long as it is true with respect to AT LEAST ONE category of the conversation". Formula in FIG. 4b depends on weights RC for the conversation D and the list of conversation co-authors {Y}. Other forms of parameterization of $PI(D)_X$, given descriptors of the conversation D and user X, are obviously also possible.

In the preferred embodiment, ratings VO, VI and weights RC are the parameters that govern, respectively, selection of representative messages from similarity groups for the purpose of forming the conversation summaries, the distribution of generated summaries or their parts to end-users, and the differences and similarities between different conversations and messages, in the sense of the above two processes. These may be naturally referred to as user's expertise, user's interests and document's categories. However, since the system estimates parameters that most accurately describe the past users' engagements with the, these parameters, in fact, may lack any conventional interpretation or meaning for a non-transparent choice of the expertise or interests models.

The process of estimating VO, VI and RC parameters from the observation of past users' engagements with the conversations is the following. Weights RC may be updated periodically during the conversation lifetime by observing from which users, reviewing the conversation, a reaction was elicited. Model parameters VO and VI may be adjusted at the end of each conversation. This difference is because the information required to update $VO(C)_X$ (such as which message became finally chosen for the conversation summary) only becomes available after conversation's end, and because $VI(C)_X^Y$ needs to be updated on a time-scale different from that of the weights RC to avoid circular feedback between updates of RC and VI interlinked via the formula in FIG. 4b. Specific update procedures depend on the form of the expertise and interest models PO(VO,RC) and PI(VI,RC).

In the preferred embodiment, the updating process can be viewed as the solution of a mathematical problem, described in FIG. 5a-5e. FIG. 5a is an exemplary formula illustrating entropy S(x), depending on a set of parameters "x", such as VI, VO and/or RC, and a set of observations of the realizations of a random variable E. E is defined such that E=1 if an event occurred, and E=0 otherwise. Event may stand for "user reviewed conversation and responded" or "user submitted message that became chosen for the final summary". P(x) defines the probability, according to the current model such as in FIG. 4b or 4c, that event E=1. The mean is calculated over all up-to-now observed realizations of E. Finding best VI, VO and/or RC may be viewed as operation of maximizing the entropy S(x), as described below. FIG. 5b is an exemplary formula illustrating the update rule for the parameter "x" from the simple gradient ascent algorithm for maximization of S(x), per each new observed realization of E. Maximization of the entropy S(x) may be used to find the set of parameters "x" such that probability P(x) correctly describes P{E=1}. Here, "a" is an adjustable learning-rate parameter. FIG. 5c is an exemplary formula illustrating the form of the gradient for the model probability P(x) with respect to parameters x=RC, given that the model probability $P(x)=PI(D)_X$ is defined as in FIG. 4b. Sum is over all co-authors of the conversation D-{Y}. Formula may be used to adjust RC(C) for the given conversation D upon observing realization of the event such as "user X was presented the conversation D and got (did not get) interested". FIG. 5d is an exemplary formula illustrating the form of the gradient for the model probability P(x) with respect to parameters x=VI, given that the model probability $P(x)=PI(D)_X$ is defined as in FIG. 4b. Formula may be used to adjust $VI(C)_X^Y$ for the given user X upon observing realizations of the event such as "user X was presented the conversation D and was (was not) interested". FIG. 5e is an exemplary formula describing the form of the gradient for the model probability P(x) with respect to parameters x=VO, given that the model probability P(x)=PO(M) is defined as in FIG. 4c. Formula may be used to adjust $VO(C)_X$ for given user X upon observing realization of the event such as "user X co-authored message M that got (did not get) selected for the final conversation summary". Note that because absolute magnitude of gradient of P(x) in FIG. 5b-e cancels out, these formula ignore such irrelevant common factors.

In more detail, consider a general random variable E corresponding to a binary event defined such that E=1 if event occurs, and E=0 otherwise (as above). Using a model describing the probability of event E=1 given parameters "x", P(x), the parameters "x" may be estimated given the set of observed realizations of E. This problem may be solved by maximizing entropy S(x) defined by the formula in FIG. 5a. This entropy is the average of the random variable E, weighted by the current estimate P(x). It may be shown that S(x) is maximized if and only if P(x)=P{E=1}. Thus, to find the correct values for the parameter "x" the system simply maximizes S(x) for a set of observed outcomes for E. To find the set of parameters "x" maximizing S(x), the system may use known mathematical methods. For example, one simple method is gradient ascend on S(x), which leads to the update rules for the parameters "x", per each new observed realization of E, as described in the formula in FIG. 5b. The formula in FIG. 5b prescribes, upon observing new realization of the event E, to adjust parameters "x" in/against direction of the gradient of P(x) at the current value of "x", weighted additionally by the inverse of the current estimate for P(x) or 1−P(x).

For example, assume that during some conversation lifetime, authored by users {Y} in categories RC(C), a user X was presented the conversation summary D and responded. Upon observing this event, the system may use formulas in FIGS. 5b and 5c to adjust the weights RC(C) for this conversation given this new information. In that case, E is assumed to be 1, and FIG. 5c gives the definition for how the gradient of P(x) should be computed in order to be used in the update rule in FIG. 5b. Likewise, assume that during same conversation lifetime a user X was presented the conversation summary and did not respond. In that case, E is 0, and FIG. 5c gives the definition for how the gradient of P(x) should be computed (again, for use with the update rule in FIG. 5b). Likewise, upon conversation's end, for each of the recorded events, such as above, the system may use formulas in FIGS. 5b and 5d to adjust ratings $VI(C)_X^Y$ for each user X that has received the conversation summary during its lifetime. In that case, FIG. 5d gives the definition for the gradient of P(x) to be used in the update rule in FIG. 5b, and E=1 if user X responded to the conversation, and E=0 otherwise. Finally, upon conversation's end, for each event of the type "user X co-authored a message that was selected for the final conversation summary from its similarity group", the system may use formulas in FIGS. 5b and 5e to adjust ratings $VO(C)_X$ for that user X. In that case, FIG. 5e gives the definition for the gradient of P(x) to be used with the update rule in FIG. 5b, and E=1. Likewise, for each event of the type "user X co-authored message that was not selected for the final conversation summary from its similarity group", the system may use formulas in FIGS. 5b and 5e with E=0.

Figure 6:
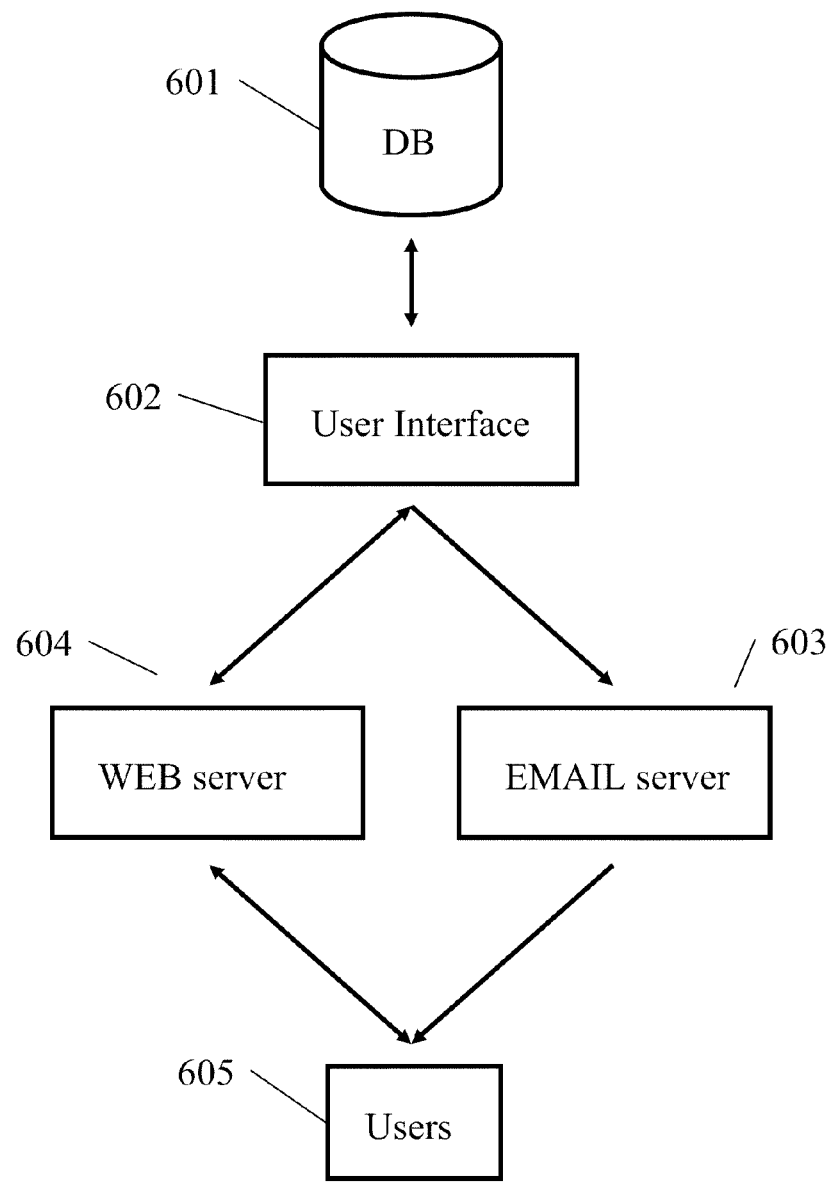
FIG. 6 is an example illustrating the preferred implementation of the present invention as a web-server application.

A diagram for possible software system implementing the preferred embodiment is described in FIG. 6, as a web-application. The system contains database server 601, user-interface server 602, email server 603 for offline distribution of conversation summaries, and web-server 604 for online interaction with the users 605.

In one embodiment, the software system contains a gateway server running Internet server software (604), email server and/or SMS (Short Message Service) and/or IM (Instant Messenger)-gateway server (603), a server running database software (601), and a server running interface software (602) that manages interactions between users 605 and the database 601. The database 601 maintains the tables with the information necessary for the overall system configuration (such as settings) as well as the general profiles of all system users, including their VI and VO-ratings. It also contains the tables containing the list of all messages in the common pull and their contents, organized into conversations, as well as the information about RC-characteristics of all conversations and messages, lists of co-authors for all conversations and messages, the likelihoods PO and PI for all conversations and messages, and previously computed distribution patterns G(X) for all users X. The Internet server 604 and email/SMS/IM-gateway server 603 are standard software packages that run on the same or a separate server(s) to provide the system with the functionality to accept and to send online Internet messages via HTTP protocol, and to send email/SMS/IM messages to the system users.

Interface software 602 implements the means for interacting with the users, either via the web-server application 604 or via the offline messaging gateway 603, as well as the means for managing and updating the structures in the database 601. The interface software supports the following modes of the operations—interacting with users (FIG. 7), circulating messages (FIG. 8), and updating the database (FIG. 9).

Figure 7:
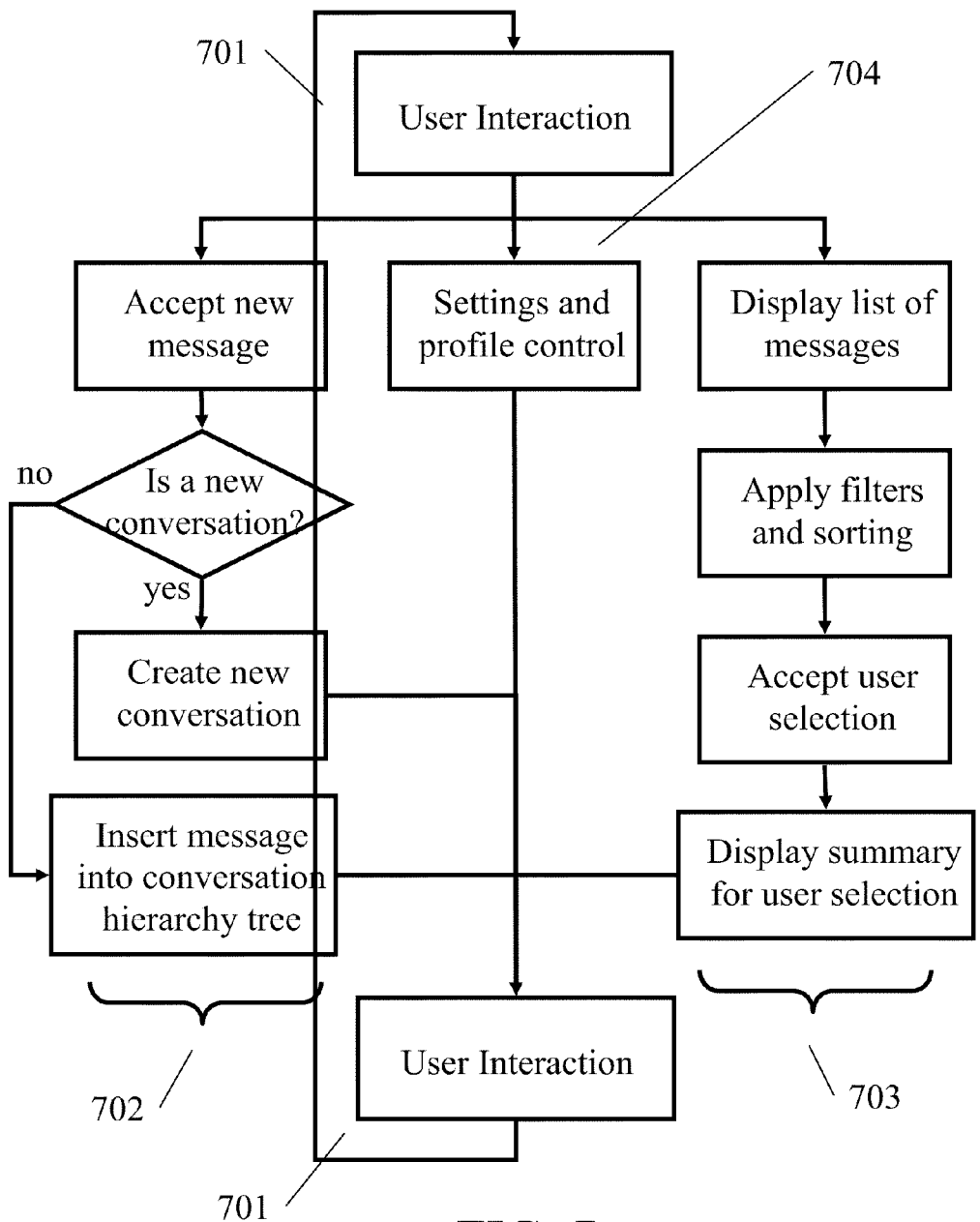
FIG. 7 is an exemplary block schema illustrating one implementation to serve user interactions.

FIG. 7 is an exemplary block schema illustrating possible implementation for the subsystem of 602 responsible for interacting with users via web-server 604. Subsystem 701 performs three major functions. First, the block schema 702 describes accepting incoming messages from users, including receiving messages, inserting messages into database, creating new conversation or linking messages within existing conversations. Second, the block schema 703 described displaying lists of messages, sorting and filtering messages, accepting selections from users and displaying requested summaries. Third, the process handles changes in the system settings and user profiles 704.

The primary objective of the interface software 502 is to handle incoming messages, 702, and display different summaries of different conversations upon user's or system's request, 703, that may be performed, for example, via online WEB interface 604. Incoming messages 702 may be accepted as new conversations, or a message may be accepted as a contribution within ongoing conversation. If a message is a new conversation, the list of categories to which this conversation pertains, which serves as the initial estimate for the conversation characteristics RC, is requested from the user at the time of submission. Thus, the user is offered to select a list of categories and then this selection is recorded as the characteristics RC in the database 601 such that RC(C)=1 for selected categories C, and RC(C)=0 otherwise. If incoming message is a contribution within an ongoing conversation, a reference within that conversation is requested from the user at the time of submission in order to place that incoming message in the context of the conversation summary. This selection is then recorded in the database 601 as a link to the identifier of the indicated summary context. Interface software also manages such operations as online user registrations, changing system settings, updating user profiles, and displaying, sorting and filtering the lists of ongoing conversations, as well as displaying conversation summaries, their parts, and messages within different conversations in various formats upon users' requests, 703.

Figure 8:
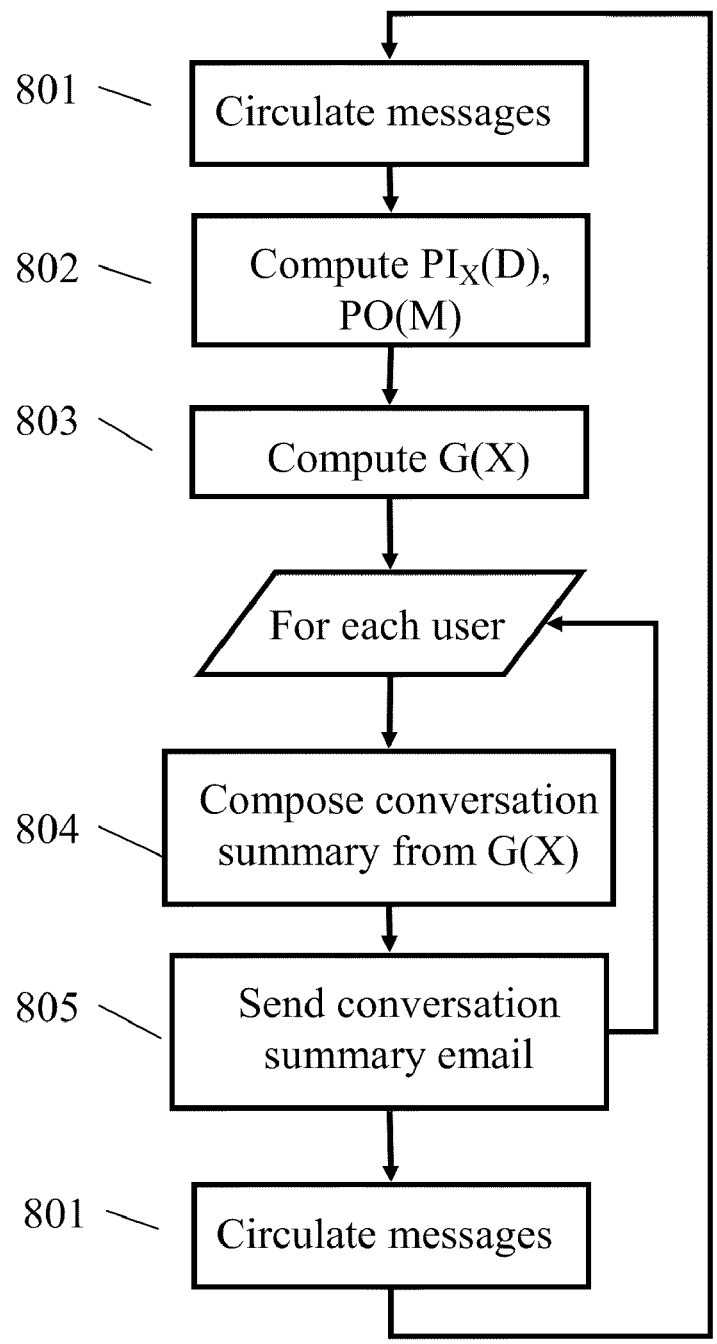
FIG. 8 is an exemplary block schema illustrating one implementation for offline circulation of summaries.
Figure 9:
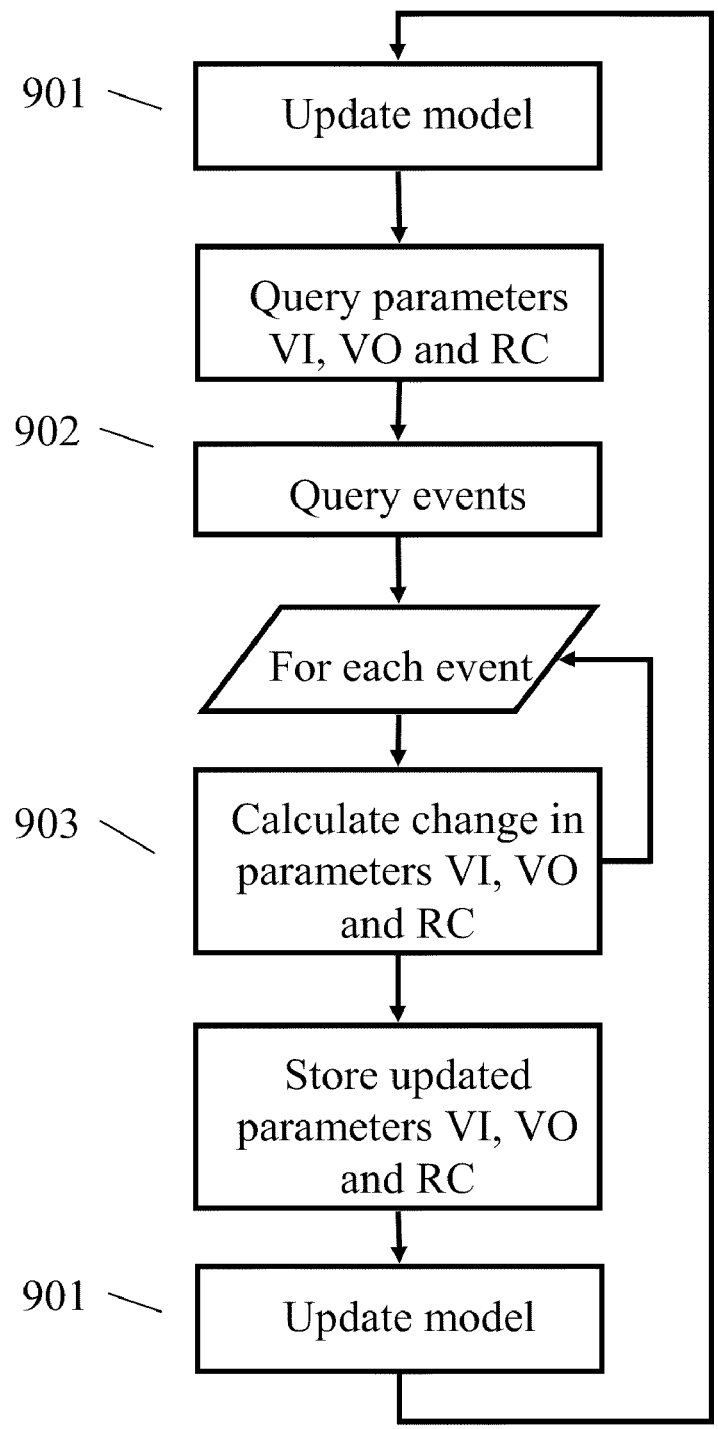
FIG. 9 is an exemplary block schema illustrating one implementation for database update.

FIG. 8 is an exemplary block schema illustrating possible implementation for subsystem of 602 responsible for offline circulation of summaries via 603. Subsystem 801 calculates ratings PI and PO for each user and each message based on VI and VO ratings, lists of co-authors, and characteristics RC, 802, computes distribution lists G(X), 803, composes summaries for conversations or their parts in the distribution lists G(X), 804, and sends summaries via gateway 603, 805. PI and PO-ratings and the distribution lists for all users, G(X), from the optimal distribution pattern G are computed using formulas in FIG. 4a-4c, as described above, and are stored in the database 601.

FIG. 9 is an exemplary block schema illustrating possible implementation for subsystem of 602 responsible for database update. Subsystem 901 queries existing ratings VI, VO and weights RC from the database 601, forms lists of user events E, 902, computes update values for VI, VO and RC per each event E, 903, and writes thus updated VI, VO and RC back to the database. The events are recorded as either triples EI=(conversation identifier D, user identifier X, presentation result E=Yes/No for "user X got interested in conversation D?") or pairs EO=(message identifier M, submission result E=Yes/No for "message M was chosen for the final conversation summary from its similarity group?"). For each such event the system then updates the model parameters using the formulas in FIG. 5b-5e, as described above, 903. Finally, updated parameters are written back to the database.

In one implementation, a Question and Answer system can be implemented via an Internet website, network of mobile devices such as cell phones, or Instant Messaging system, or their equivalent. In this embodiment, new and existing messages are actively brought to the attention of system's members via email, SMS, IM or other active delivery system either in summarized, processed or unprocessed form, with accompanying context information or without it, with the purpose of review or soliciting a feedback, in the selective manner such that different submissions are delivered to different members, in accordance to an assignment pattern of messages to member, found as a solution to constrained or unconstrained maximization problem of a certain goodness function dependent on the complete distribution pattern and the features describing end-users and existing/new questions and answers, or by a solution of any different mathematical problem equivalent to such maximization.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Aside from the described preferred embodiment of the present invention, the present invention may be used in its entirety or in parts in a number of different other applications. Examples of possible other applications of the present inventions, which are all obviously within the scope of this invention, include, although not limited, to of the following, including any and all combinations of the following:

An online Internet or Intranet collaborative document writing system, commonly known as wiki, such that different editions are retained and can be voted upon for the purpose of subsequently incorporating the most popular edition into the final document (unlike plain replacement of older editions with the newer editions currently practiced in the above named wikis).

An online Internet or Intranet collaborative document writing system, commonly known as wiki, where new documents in the system and new editions to the existing documents are actively delivered to different users via email, SMS, IM or other active delivery system, with the purpose of review or soliciting a feedback, in the selective manner such that different documents and editions are delivered to different users in accordance to an assignment pattern of messages to member, found as a solution to constrained or unconstrained maximization problem of a certain goodness function dependent on the complete distribution pattern and the features describing end-users and existing/new documents/editions, or by a solution of any different mathematical problem equivalent to such maximization.

An online Internet or Intranet forum system, where new and existing submissions are actively brought to the attention of forum members either in summarized, processed or unprocessed form, with accompanying context or without it, via email, SMS, IM or other active delivery system, with the purpose of review or soliciting a feedback, in the selective manner such that different submissions are delivered to different members in accordance to an assignment pattern of messages to member, found as a solution to constrained or unconstrained maximization problem of a certain goodness function dependent on the complete distribution pattern and the features describing end-users and existing/new submissions, or by a solution of any different mathematical problem equivalent to such maximization.

A Instant Messaging system implemented on a network of mobile devices such as cell phones, or its equivalent, where new and existing messages are actively brought to the attention of mobile network members either in summarized, processed or unprocessed form, with accompanying context information or without it, via that said mobile device with the purpose of review or soliciting a feedback, in the selective manner such that different submissions are delivered to different members in accordance to an assignment pattern of messages to members, found as a solution to constrained or unconstrained maximization problem of a certain goodness function dependent on the complete distribution pattern and the features describing end-users and existing/new messages, or by a solution of any different mathematical problem equivalent to such maximization.

A Instant Messaging system implemented via a software that can run on a computer, or its equivalent, where new and existing messages are actively brought to the attention of mobile network members either in summarized, processed or unprocessed form, with accompanying context information or without it, via that said software with the purpose of review or soliciting a feedback, in the selective manner such that different submissions are delivered to different members in accordance to an assignment pattern of messages to member, found as a solution to constrained or unconstrained maximization problem of a certain goodness function dependent on the complete distribution pattern and the features describing end-users and existing/new messages, or by a solution of any different mathematical problem equivalent to such maximization.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. An electronically implemented method for actively exchanging messages in a group of individuals, comprising:
   a. accumulating messages from individuals in at least one hub comprising a processor;
   b. processing with the processor and reorganizing accumulated messages and groups of accumulated messages with similar contents into short representations without or with insignificant information loss for said single messages or said groups; and
   c. selectively distributing, by the processor, messages containing the short representations in place of accumulated messages according to a distribution pattern achieving a constrained maximum of a goodness function depending on the distribution pattern and parameters describing group members and the messages,
   wherein the goodness function is defined as a linear function, $f(d)=\Sigma_{X,D \in G(X)} PI_X(D)$, subject to a linear constraint of a form $\Sigma_{X,D \in G(X)} q_X(D) \leq r$, where X identifies different individuals in the group, G(X) identifies a list of messages to be sent to individual X, D identifies one of the messages in the system, $PI_X(D)$ $q_x(D)$ are real valued coefficients depending on features of the message D and individual X, r is an acceptability constraint and the sum f(d) is over all individuals X and messages D in G(X) jointly and
   wherein the coefficient $PI_X(D)$ uses a probabilistic model of individuals' responses to messages, $PI_X(D)=1-\Pi_{Y \in A(D)} \Pi_c (1-RC_D(c) VI_X^Y(c))$, where $PI_X(D)$ is identified with the probability that individual X will respond positively, in a certain sense, to message D, and where Y identifies different individuals in the group, c identifies different categories to which a message can be related, A(D) identifies a list of authors of message D, $RC_D(c)$ for all c identifies a set of features, valued between 0 and 1, describing the message D in relation to the set of categories c, and $VI_X^Y(c)$ for all Y and c is a set of features, valued between 0 and 1, describing the individual X in relation to the set of categories c and message authors Y.

2. The method of claim 1, wherein said processing and reorganizing of accumulated messages is based on a hierarchical conversation format in which a hierarchy of messages comprises a directional parent-child relationship.

3. The method of claim 2, comprising applying a reduction model and a model of individuals' expertise to generate a short representation of the group of same-parent messages.

4. The method of claim 3, comprising determining the parameters for the model of individuals' expertise from observations of past individuals' activity.

5. The method of claim 1, wherein the active communication channel provides online "live" conversations between an individual and the group.

6. The method of claim 1, wherein the messages include text messages, voice messages, or video messages.

7. The method of claim 1, wherein the messages are accumulated and distributed by a website, an email, Short Message Service, Instant Messaging, or a mobile communication device.

8. The method of claim 1, comprising actively soliciting feedback from individuals to messages by distributing each message via email, Short Message Service or Instant Messages to a selected number of individuals according to predetermined criteria.

9. The method of claim 1, comprising selecting a distribution pattern of messages to users to maximize the goodness function, which depends on the features of messages and individuals and the set of distribution lists for all members either jointly or separately, and wherein messages are either processed before re-distribution or re-distributed in their original form.

10. A method for distributing messages to individuals in a communication system, comprising
   a. accumulating messages from individuals in at least one hub comprising a processor;
   b. processing with the processor and reorganizing accumulated messages and groups of accumulated messages with similar contents into short representations without or with insignificant information loss for said single messages or said groups; and c. distributing, by the processor, messages containing short representations in place of accumulates messages to individuals according to one or more distribution lists, each distribution list specifying which messages are to be delivered to each individual, wherein the one or more distribution lists are chosen by finding a maximum of a goodness function that depends on the distribution lists and the parameters describing the individuals and the messages, wherein the goodness function is defined as a linear function, $f(d)=\Sigma_{X,D\epsilon G(X)}PI_X(D)$, subject to a linear constraint of the form $\Sigma_{X,D\epsilon G(X)}q_X(D) \leq r$, where X identifies different individuals in the group, G(X) identifies the list of messages to be sent to individual X, D identifies one of the messages in the system, $PI_X(D)$ $q_X(D)$ are real valued coefficients depending on the features of the message D and individual X, r is an acceptability constraint and the sum f(d) is over all individuals X and messages D in G(X) jointly and wherein the coefficient $PI_X(D)$ uses a probabilistic model of individuals' responses to messages, $PI_X(D)=1-\Pi_{Y\epsilon A(D)}\Pi_c(1-RC_D(c)VI_X^Y(c))$, where $PI_X(D)$ is identified with the probability that individual X will respond positively, in a certain sense, to message D, and where Y identifies different individuals in the group, c identifies different categories to which a message can be related, A(D) identifies a list of authors of message D, $RC_D(c)$ for all c identifies a set of features, valued between 0 and 1, describing the message D in relation to the set of categories c, and $VI_X^Y(c)$ for all Y and c is a set of features, valued between 0 and 1, describing the individual X in relation to the set of categories c and message authors Y.

11. The method of claim 10, wherein the goodness function comprises a function of features describing all messages and all individuals and the set of all distribution lists for all individuals and all messages, simultaneously and jointly, wherein the maximum is subject to a constraint described in terms of features of all messages and all individuals and the distribution lists for all individuals and all messages.

12. The method of claim 10, comprising generating a probabilistic model of individuals' responses to distributed messages, that depends both on features describing the individuals and the messages, wherein this model is used to determine the goodness function.

13. The method of claim 10, wherein the goodness function is a sum of predetermined match-scores for assignment pairs, message-to-individual, from all distribution lists for all individuals and all messages.

14. The method of claim 12, comprising determining the parameters of the probabilistic model of individuals' responses, including both features describing the individuals and the messages, from observations of past individuals' activity.

15. The method of claim 14, comprising the probabilistic model of individuals' responses, wherein the features describing the individuals $VI_X^Y(c)$ are updated per each observation of either positive or negative response from an individual to a distributed message according to $$\Delta VI_X^Y(c) = \frac{1}{E-(1-PI_X(D))} \frac{\partial P_X^Y(c)}{|\partial P|} lr,$$

where $\partial P_X^Y(c)$ is a vector with respect to category index c and author index Y, defined as $$\partial P_X^Y(c) = \frac{RC_D(c)}{1-RC_D(c)VI_X^Y(c)},$$

$|\partial P|$ means the norm of that vector in conventional sense, E=1 for positive and E=0 for negative response from individual X to message D, and lr is an adjustable learning rate.

16. The method of claim 14, comprising the probabilistic model of individuals' responses, wherein the features describing the messages $RC_D(c)$ are updated per each observation of either positive or negative response from an individual to a distributed message according to $$\Delta RC_D(c) = \frac{1}{E-(1-PI_X(D))} \frac{\partial P_D(c)}{|\partial P|} lr,$$

where $\partial P_D(c)$ is a vector with respect to category index c, defined as $$\partial P_D(c) = \sum_{Y\in A(D)} \frac{VI_X^Y(c)}{1-RC_D(c)VI_X^Y(c)},$$

$|\partial P|$ means the norm of that vector in conventional sense, E=1 for positive and E=0 for negative response from individual X to message D, and lr is an adjustable learning rate.

* * * * *